US010565672B2

(12) United States Patent
Kim et al.

(10) Patent No.: US 10,565,672 B2
(45) Date of Patent: Feb. 18, 2020

(54) ELECTRONIC DEVICE FOR COMPOSING GRAPHIC DATA AND METHOD THEREOF

(71) Applicant: Samsung Electronics Co., Ltd., Gyeonggi-do (KR)

(72) Inventors: Seung Jin Kim, Suwon-si (KR); Jong Gab Park, Suwon-si (KR); Woo Jun Jung, Hwaseong-si (KR); Min Jung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 15/499,246

(22) Filed: Apr. 27, 2017

(65) Prior Publication Data
US 2017/0316541 A1 Nov. 2, 2017

(30) Foreign Application Priority Data

Apr. 27, 2016 (KR) ........................ 10-2016-0051743

(51) Int. Cl.
*G06T 1/20* (2006.01)
*G06F 9/451* (2018.01)
(Continued)

(52) U.S. Cl.
CPC ................ *G06T 1/20* (2013.01); *G06F 9/451* (2018.02); *G06T 1/60* (2013.01); *G09G 5/006* (2013.01);
(Continued)

(58) Field of Classification Search
CPC ........... G06T 1/20; G06T 15/503; G06T 1/60; G06T 2207/20221; G06T 5/50;
(Continued)

(56) References Cited

U.S. PATENT DOCUMENTS 7,274,370 B2 9/2007 Paquette
7,652,678 B2 1/2010 Brunner et al.
(Continued)

OTHER PUBLICATIONS

Bui et al.; "Rethinking Energy-Performance Trade-Off in Mobile Web Page Loading"; MobiCom '15; Paris, France; Sep. 7-11, 2015; 13 pages.

(Continued)

*Primary Examiner* — Xilin Guo

(57) ABSTRACT

An electronic device includes a first graphic composer that composes first graphic data associated with a layer of a first composition type, a second graphic composer that composes second graphic data associated with a layer of a second composition type different from the first composition type. The electronic device also includes a processor that sets a composition type of each of a plurality of layers associated with at least one application to the first or second composition type, composes first graphic data corresponding to a layer set to the first composition type using the first graphic composer, compose the composed graphic data in the frame buffer and second graphic data corresponding to a layer set to the second composition type using the second graphic composer, and display the composed graphic data through a display connected with the electronic device.

18 Claims, 10 Drawing Sheets

(51) Int. Cl.
*G06T 1/60* (2006.01)
*G09G 5/00* (2006.01)
*G09G 5/395* (2006.01)

(52) U.S. Cl.
CPC ......... *G09G 5/395* (2013.01); *G09G 2360/12* (2013.01); *G09G 2360/18* (2013.01)

(58) Field of Classification Search
CPC ......... G06T 11/60; G06T 11/00; G06T 19/20; G06T 2207/10028; G06T 2207/10072; G06F 1/3212; G06F 9/4418; G06F 16/58; G06F 16/24547; G06F 16/48; G06F 16/7867; G06F 3/0481; H04W 52/0277; H04W 52/0287; G05B 2219/25289; G09G 2360/08; G09G 2360/12; G09G 2360/18; G09G 2340/12; G09G 5/00; G09G 5/363; G09G 5/006; G09G 5/395; G09G 2340/10; G09G 5/4418; G03F 7/11; G03F 7/3014
See application file for complete search history.

(56) References Cited

U.S. PATENT DOCUMENTS

| | | | |
|---|---|---|---|
| 7,969,453 B2 | 6/2011 | Brunner et al. | |
| 8,130,226 B2 | 3/2012 | Brunner et al. | |
| 8,144,159 B2 | 3/2012 | Brunner et al. | |
| 8,446,415 B2 | 5/2013 | Brunner et al. | |
| 8,477,143 B2 | 7/2013 | Harper et al. | |
| 8,842,133 B2 | 9/2014 | Harper et al. | |
| 2002/0171765 A1* | 11/2002 | Waki | G09G 5/14 348/589 |
| 2005/0168471 A1 | 8/2005 | Paquette | |
| 2005/0285867 A1 | 12/2005 | Brunner et al. | |
| 2007/0182749 A1 | 8/2007 | Brunner et al. | |
| 2007/0257925 A1 | 11/2007 | Brunner et al. | |
| 2008/0030504 A1 | 2/2008 | Brunner et al. | |
| 2009/0225093 A1 | 9/2009 | Harper et al. | |
| 2010/0058229 A1 | 3/2010 | Mercer | |
| 2011/0157474 A1* | 6/2011 | Nagata | H04N 5/445 348/598 |
| 2011/0216079 A1 | 9/2011 | Brunner et al. | |
| 2012/0188255 A1 | 7/2012 | Brunner et al. | |
| 2013/0328922 A1 | 12/2013 | Belanger | |
| 2013/0335443 A1 | 12/2013 | Harper et al. | |
| 2015/0035860 A1 | 2/2015 | Harper et al. | |
| 2015/0100884 A1* | 4/2015 | Ryu | G09G 5/397 715/719 |
| 2016/0314557 A1* | 10/2016 | Croxford | G06T 1/60 |
| 2017/0032764 A1* | 2/2017 | Radhakrishnan | G09G 5/393 |

OTHER PUBLICATIONS

He et al.; "Optimizing Smartphone Power Consumption through Dynamic Resolution Scaling"; MobiCom '15; Paris, France; Sep. 7-11, 2015; 13 pages.

Lee et al.; "EnTrack: A System Facility for Analyzing Energy Consumption of Android System Services"; UBICOMP 15; Osaka, Japan; Sep. 7-11, 2015; 12 pages.

Singhai et al; "Reducing Power Consumption in Android Applications"; 2014 IEEE International Advance Computing Conference (IACC); Guragon, India; Feb. 21-22, 2014; 6 pages.

Foreign Communication from Related Counterpart Application; European Patent Application No. 17168233.9; Extended European Search Report and European Search Opinion dated Feb. 20, 2018; 13 pages.

\* cited by examiner

ELECTRONIC DEVICE FOR COMPOSING GRAPHIC DATA AND METHOD THEREOF

CROSS-REFERENCE TO RELATED APPLICATION(S) AND CLAIM OF PRIORITY

This application claims the benefit under 35 U.S.C. § 119(a) of a Korean patent application filed on Apr. 27, 2016 in the Korean Intellectual Property Office and assigned Serial number 10-2016-0051743, the entire disclosure of which is hereby incorporated by reference.

TECHNICAL FIELD

The present disclosure relates to an electronic device for composing graphic data and a method thereof.

BACKGROUND

With developments of information and communication technology, network devices such as a base station and the like are installed throughout the country. An electronic device transmits and receives data to and from another electronic device over a network, and thus a user utilizes the network freely anywhere in the country.

Various kinds of the electronic devices provide a variety of functions to cope with the recent trend of the digital convergence. For example, a smartphone supports a function to connect to the Internet over the network, as well as a call function. Furthermore, the smartphone supports the following: a function of playing music or a video and a function of capturing video and photo by using an image sensor.

To perform the above-described functions, the smartphone may include a battery that supplies electric power. The electronic device may consume a lot of current to perform the above-described functions.

SUMMARY

To address the above-discussed deficiencies, it is a primary to provide an electronic device and a method for reducing current consumption for an application output.

In accordance with an aspect of the present disclosure, an electronic device includes a first graphic composer that composes first graphic data associated with a layer of a first composition type, a second graphic composer that composes second graphic data associated with a layer of a second composition type different from the first composition type, and a processor. The processor is configured to set a composition type of each of a plurality of layers associated with at least one application to the first composition type or the second composition type, compose first graphic data corresponding to a layer, which is set to the first composition type, from among the plurality of layers in a frame buffer by using the first graphic composer, compose the composed graphic data in the frame buffer and second graphic data corresponding to a layer, which is set to the second composition type, from among the plurality of layers by using the second graphic composer, and display the graphic data composed by using the second graphic composer through a display operatively connected with the electronic device.

In accordance with another aspect of the present disclosure, a graphic data composing method of an electronic device includes setting a composition type of each of a plurality of layers associated with at least one application to a first composition type or a second composition type, composing first graphic data corresponding to a layer, which is set to the first composition type, from among the plurality of layers in a frame buffer by using a first graphic composer, composing the composed graphic data in the frame buffer and second graphic data corresponding to a layer, which is set to the second composition type, from among the plurality of layers by using a second graphic composer, and displaying the graphic data composed by using the second graphic composer through a display operatively connected with the electronic device.

In accordance with another aspect of the present disclosure, a computer-readable recording medium having recorded thereon a program, the program, when executed, performing a method that includes setting a composition type of each of a plurality of layers associated with at least one application to a first composition type or a second composition type, composing first graphic data corresponding to a layer, which is set to the first composition type, from among the plurality of layers in a frame buffer by using a first graphic composer, composing the composed graphic data in the frame buffer and second graphic data corresponding to a layer, which is set to the second composition type, from among the plurality of layers by using a second graphic composer, and displaying the graphic data composed by using the second graphic composer through a display operatively connected with the electronic device.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
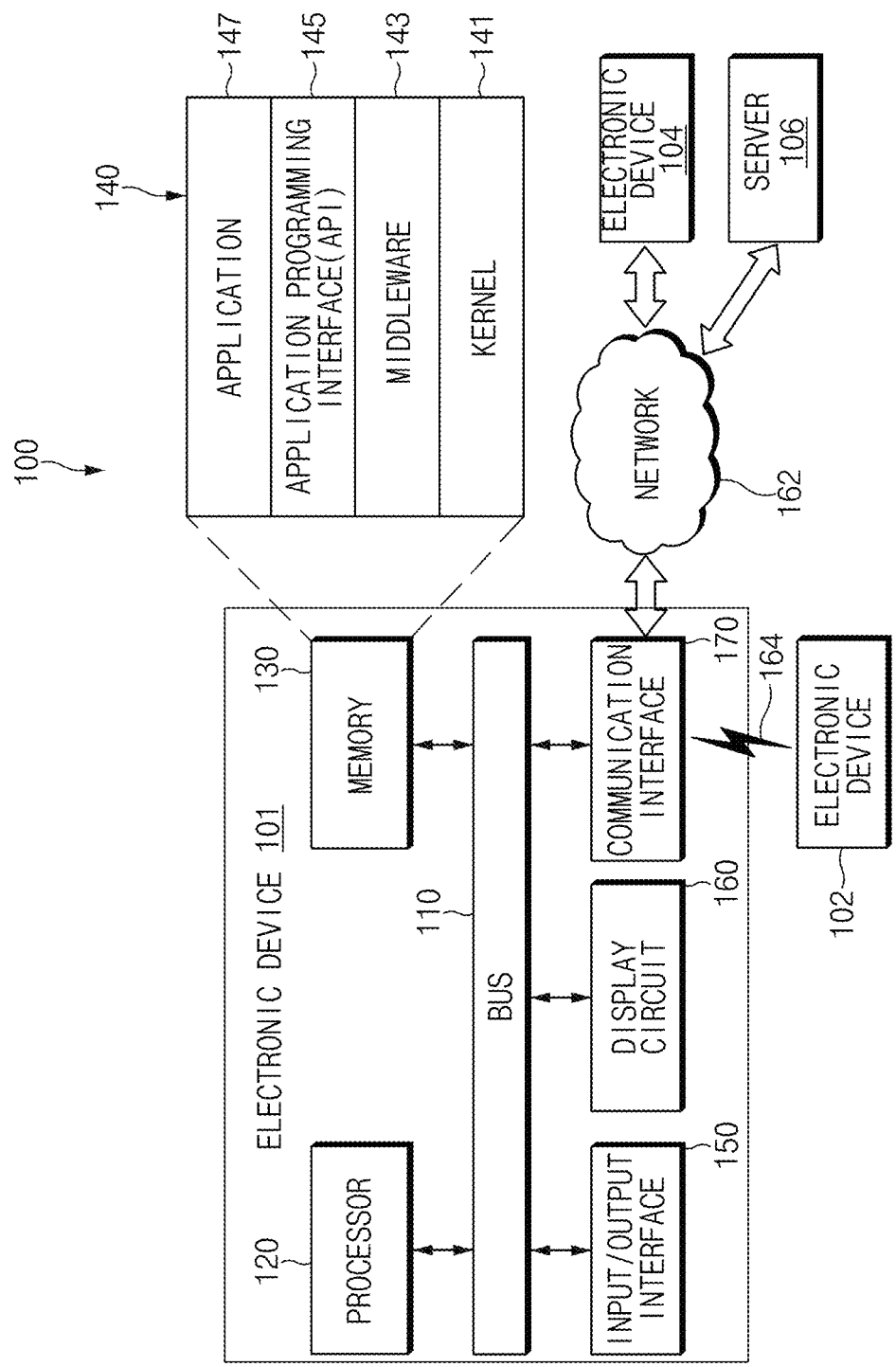
FIG. 1 illustrates an electronic device in a network environment, according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The term "include," "comprise," and "have", or "may include," or "may comprise" and "may have" used herein indicates disclosed functions, operations, or existence of elements but does not exclude other functions, operations or elements.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates an electronic device in a network environment according to an embodiment of the present disclosure.

An electronic device 101 in a network environment 100 according to various embodiments of the present disclosure will be described with reference to FIG. 1. The electronic device 101 may include a bus 110, a processor 120, a memory 130, an input/output interface 150, a display 160, and a communication interface 170. In various embodiments of the present disclosure, at least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a central processing unit (CPU), an application processor (AP), or a communication processor (CP). The processor 120 may perform data processing or an operation related to communication and/or control of at least one of the other elements of the electronic device 101.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141.

Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, or the like) of the electronic device 101. For example, the middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, or the like.

The input/output interface 150 may serve to transfer an instruction or data input from a user or another external device to (an)other element(s) of the electronic device 101. Furthermore, the input/output interface 150 may output instructions or data received from (an)other element(s) of the electronic device 101 to the user or another external device.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

The communication interface 170 may set communications between the electronic device 101 and an external device (e.g., a first external electronic device 102, a second external electronic device 104, or a server 106). For example, the communication interface 170 may be connected to a network 162 via wireless communications or wired communications so as to communicate with the external device (e.g., the second external electronic device 104 or the server 106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 164. The short-range communications may include at least one of WI-FI®, BLUETOOTH®, Bluetooth low energy (BLE), ZIGBEE®, near field communication (NFC), magnetic secure transmission (MST), or GNSS. The GNSS may include, for example, at least one of global positioning system (GPS), global navigation satellite system (GLONASS), BeiDou navigation satellite system (BEIDOU), or GALILEO, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), or the like. The network 162 may include at least one of telecommunications networks, for example, a computer network (e.g., local area network (LAN) or wide area network (WAN)), the Internet, or a telephone network.

The types of the first external electronic device 102 and the second external electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first electronic device 102, the second external electronic device 104, or the server 106). When the electronic device 101 should perform a certain function or service automatically or in response to a request, the electronic device 101 may request at least a portion of functions related to the function or service from another device (e.g., the first electronic device 102, the second external electronic device 104, or the server 106) instead of or in addition to performing the function or service for itself. The other electronic device (e.g., the first electronic device 102, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 2:
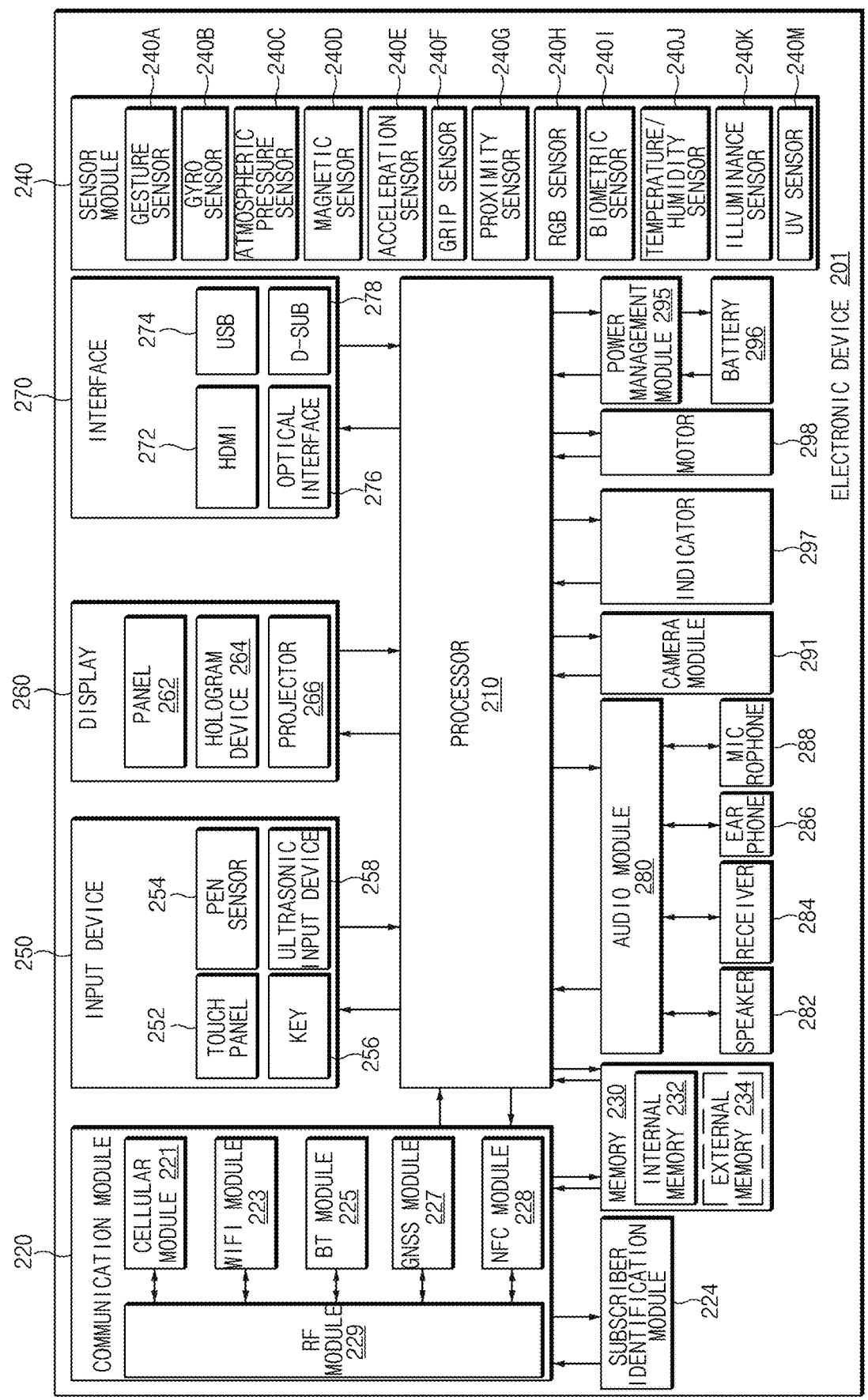
FIG. 2 illustrates an electronic device, according to various embodiments of the present disclosure.

FIG. 2 illustrates an electronic device according to an embodiment of the present disclosure.

Referring to FIG. 2, an electronic device 201 may include, for example, a part or the entirety of the electronic device 101 illustrated in FIG. 1. The electronic device 201 may include at least one processor (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may run an operating system or an application program so as to control a plurality of hardware or software elements connected to the processor 210, and may process various data and perform operations. The processor 210 may be implemented with, for example, a system on chip (SoC). According to an embodiment of the present disclosure, the processor 210 may further include a graphic processing unit (GPU) and/or an image signal processor. The processor 210 may include at least a portion (e.g., a cellular module 221) of the elements illustrated in FIG. 2. The processor 210 may load, on a volatile memory, an instruction or data received from at least one of other elements (e.g., a nonvolatile memory) to process the instruction or data, and may store various data in a nonvolatile memory.

The communication module 220 may have a configuration that is the same as or similar to that of the communication interface 170 of FIG. 1. The communication module 220 may include, for example, a cellular module 221, a Wi-Fi module 223, a Bluetooth module 225, a GNSS module 227 (e.g., a GPS module, a GLONASS module, a BeiDou module, or a Galileo module), an NFC module 228 and a radio frequency (RF) module 229.

The cellular module 221 may provide, for example, a voice call service, a video call service, a text message service, or an Internet service through a communication network. The cellular module 221 may identify and authenticate the electronic device 201 in the communication network using the subscriber identification module 224 (e.g., a SIM card). The cellular module 221 may perform at least a part of functions that may be provided by the processor 210. The cellular module 221 may include a communication processor (CP).

Each of the Wi-Fi module 223, the Bluetooth module 225, the GNSS module 227 and the NFC module 228 may include, for example, a processor for processing data transmitted/received through the modules. According to some various embodiments of the present disclosure, at least a part (e.g., two or more) of the cellular module 221, the Wi-Fi module 223, the Bluetooth module 225, the GNSS module 227 and the NFC module 228 may be included in a single integrated chip (IC) or IC package.

The RF module 229 may transmit/receive, for example, communication signals (e.g., RF signals). The RF module 229 may include, for example, a transceiver, a power amp module (PAM), a frequency filter, a low noise amplifier (LNA), an antenna, or the like. According to another embodiment of the present disclosure, at least one of the cellular module 221, Wi-Fi module 223, the Bluetooth module 225, the GNSS module 227 and the NFC module 228 may transmit/receive RF signals through a separate RF module.

The SIM 224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 234 may include a flash drive such as a compact flash (CF), a secure digital (SD), a Micro-SD, a Mini-SD, an extreme digital (xD), a MultiMediaCard (MMC), a memory stick, or the like. The external memory 234 may be operatively and/or physically connected to the electronic device 201 through various interfaces.

The sensor module 240 may, for example, measure physical quantity or detect an operation state of the electronic device 201 so as to convert measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red/green/blue (RGB) sensor), a biometric sensor 240I, a temperature/humidity sensor 240J, an illumination sensor 240K, or an ultraviolet (UV) sensor 240M. Additionally or alternatively, the sensor module 240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 240 may further include a control circuit for controlling at least one sensor included therein. In some various embodiments of the present disclosure, the electronic device 201 may further include a processor configured to control the sensor module 240 as a part of the processor 210 or separately, so that the sensor module 240 is controlled while the processor 210 is in a sleep state.

The input device 250 may include, for example, a touch panel 252, a (digital) pen sensor 254, a key 256, or an ultrasonic input device 258. The touch panel 252 may employ at least one of capacitive, resistive, infrared, and ultraviolet sensing methods. The touch panel 252 may further include a control circuit. The touch panel 252 may further include a tactile layer so as to provide a haptic feedback to a user.

The (digital) pen sensor 254 may include, for example, a sheet for recognition which is a part of a touch panel or is separate. The key 256 may include, for example, a physical button, an optical button, or a keypad. The ultrasonic input device 258 may sense ultrasonic waves generated by an input tool through a microphone 288 so as to identify data corresponding to the ultrasonic waves sensed.

The display 260 (e.g., the display 160) may include a panel 262, a hologram device 264, or a projector 266. The panel 262 may have a configuration that is the same as or similar to that of the display 160 of FIG. 1. The panel 262 may be, for example, flexible, transparent, or wearable. The panel 262 and the touch panel 252 may be integrated into a single module. The hologram device 264 may display a stereoscopic image in a space using a light interference phenomenon. The projector 266 may project light onto a screen so as to display an image. The screen may be disposed in the inside or the outside of the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270, for example, may be included in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may convert, for example, a sound into an electrical signal or vice versa. At least a portion of elements of the audio module 280 may be included in the input/output interface 150 illustrated in FIG. 1. The audio module 280 may process sound information input or output through a speaker 282, a receiver 284, an earphone 286, or the microphone 288.

The camera module 291 is, for example, a device for shooting a still image or a video. According to an embodiment of the present disclosure, the camera module 291 may include at least one image sensor (e.g., a front sensor or a rear sensor), a lens, an image signal processor (ISP), or a flash (e.g., an LED or a xenon lamp).

The power management module 295 may manage power of the electronic device 201. According to an embodiment of the present disclosure, the power management module 295 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, or the like. The motor 298 may convert an electrical signal into a mechanical vibration, and may generate a vibration or haptic effect. Although not illustrated, a processing device (e.g., a GPU) for supporting a mobile TV may be included in the electronic device 201. The processing device for supporting a mobile TV may process media data according to the standards of digital multimedia broadcasting (DMB), digital video broadcasting (DVB), MEDIA-FLO™, or the like.

Figure 3:
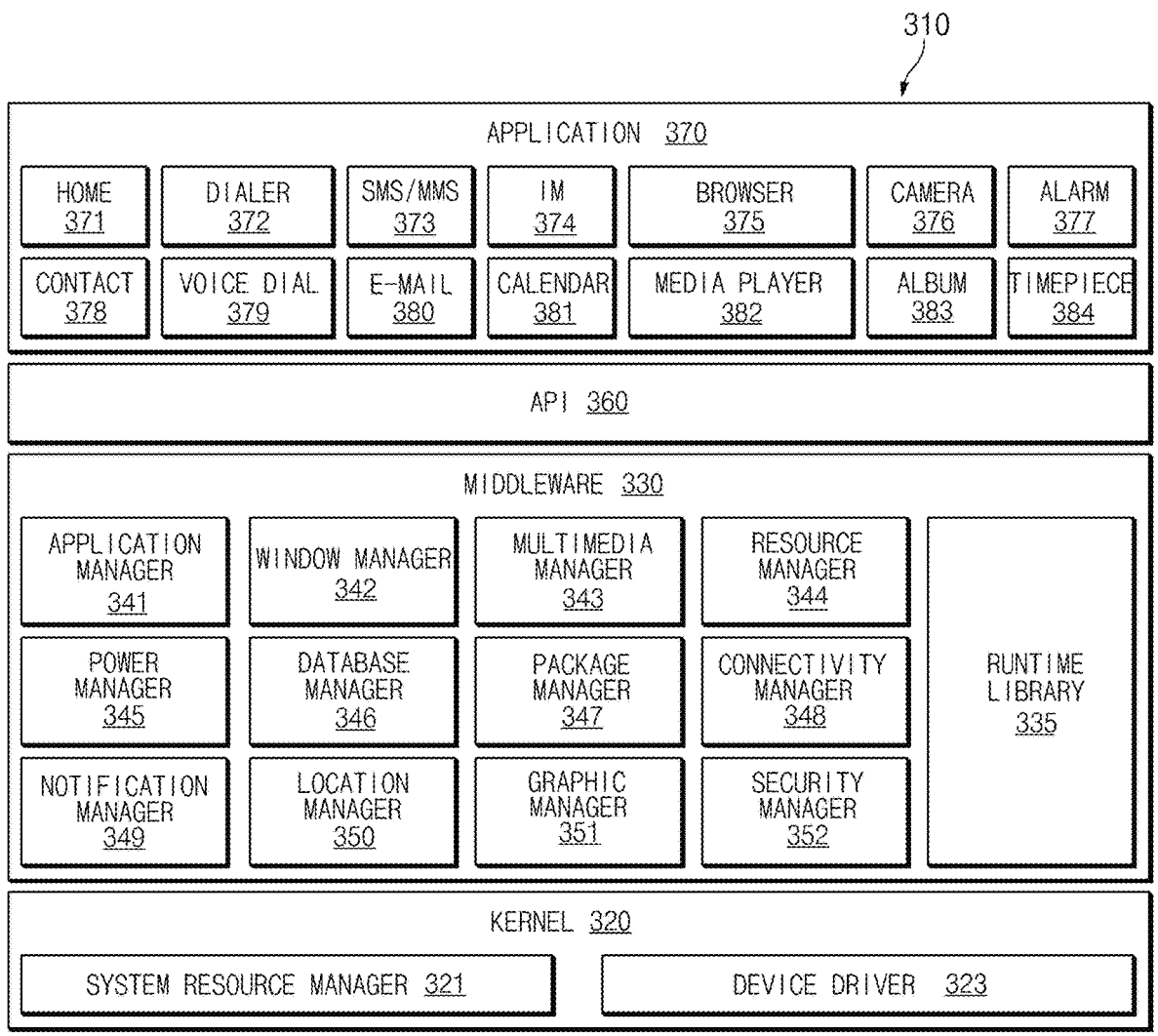
FIG. 3 illustrates a program module, according to various embodiments of the present disclosure.

FIG. 3 illustrates a program module according to an embodiment of the present disclosure.

Referring to FIG. 3, a program module 310 (e.g., the program 140) may include an operating system (OS) for controlling a resource related to an electronic device (e.g., the electronic device 101) and/or various applications (e.g., the application program 147) running on the OS. The operating system may be, for example, ANDROID®, iOS®, WINDOWS®, SYMBIAN™, TIZEN®, or the like.

The program module 310 may include a kernel 320, a middleware 330, an API 360, and/or an application 370. At least a part of the program module 310 may be preloaded on an electronic device or may be downloaded from an external electronic device (e.g., the first electronic device 102, the second external electronic device 104, or the server 106).

The kernel 320 (e.g., the kernel 141) may include, for example, a system resource manager 321 or a device driver 323. The system resource manager 321 may perform control, allocation, or retrieval of a system resource. According to an embodiment of the present disclosure, the system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330, for example, may provide a function that the applications 370 require in common, or may provide various functions to the applications 370 through the API 360 so that the applications 370 may efficiently use limited system resources in the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 and a security manager 352.

The runtime library 335 may include, for example, a library module that a complier uses to add a new function through a programming language while the application 370 is running. The runtime library 335 may perform a function for input/output management, memory management, or an arithmetic function.

The application manager 341 may mange, for example, a life cycle of at least one of the applications 370. The window manager 342 may manage a GUI resource used in a screen. The multimedia manager 343 may recognize a format required for playing various media files and may encode or decode a media file using a codec matched to the format. The resource manager 344 may manage a resource such as a source code, a memory, or a storage space of at least one of the applications 370.

The power manager 345, for example, may operate together with a basic input/output system (BIOS) to manage a battery or power and may provide power information required for operating the electronic device. The database manager 346 may generate, search, or modify a database to be used in at least one of the applications 370. The package manager 347 may manage installation or update of an application distributed in a package file format.

The connectivity manger 348 may manage wireless connection of Wi-Fi, Bluetooth, or the like. The notification manager 349 may display or notify an event such as message arrival, appointments, and proximity alerts in such a manner as not to disturb a user. The location manager 350 may manage location information of the electronic device. The graphic manager 351 may manage a graphic effect to be provided to a user or a user interface related thereto. The security manager 352 may provide various security functions required for system security or user authentication. According to an embodiment of the present disclosure, in the case in which an electronic device (e.g., the electronic device 101) includes a phone function, the middleware 330 may further include a telephony manager for managing a voice or video call function of the electronic device.

The middleware 330 may include a middleware module for forming a combination of various functions of the above-mentioned elements. The middleware 330 may provide a module specialized for each type of an operating system to provide differentiated functions. Furthermore, the middleware 330 may delete a part of existing elements or may add new elements dynamically.

The API 360 (e.g., the API 145) which is, for example, a set of API programming functions may be provided in different configurations according to an operating system. For example, in the case of Android or iOS, one API set may be provided for each platform, and, in the case of Tizen, at least two API sets may be provided for each platform.

The application 370 (e.g., the application program 147), for example, may include at least one application capable of performing functions such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a timepiece 384, health care (e.g., measure an exercise amount or blood sugar), or environmental information provision (e.g., provide air pressure, humidity, or temperature information).

According to an embodiment of the present disclosure, the application 370 may include an information exchange application for supporting information exchange between the electronic device (e.g., the electronic device 101) and an external electronic device (e.g., the first electronic device 102 or the second external electronic device 104). The information exchange application may include, for example, a notification relay application for relaying specific information to the external electronic device or a device management application for managing the external electronic device.

For example, the notification relay application may have a function for relaying, to an external electronic device (e.g., the first electronic device 102 or the second external electronic device 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 102 or the second external electronic device 104) communicating with the electronic device, an application running in the external electronic device, or a service (e.g., a call service, a message service, or the like) provided from the external electronic device.

According to an embodiment of the present disclosure, the application 370 may include a specified application (e.g., a healthcare application of a mobile medical device) according to an attribute of the external electronic device (e.g., the first electronic device 102 or the second external electronic device 104). The application 370 may include an application received from an external electronic device (e.g., the first electronic device 102 or the second external electronic device 104). The application 370 may include a preloaded application or a third-party application downloadable from a server. The names of the elements of the program module 310 illustrated may vary with the type of an operating system.

According to various embodiments of the present disclosure, at least a part of the program module 310 may be implemented with software, firmware, hardware, or a combination thereof. At least a part of the program module 310, for example, may be implemented (e.g., executed) by a processor (e.g., the processor 210). At least a part of the program module 310 may include, for example, a module, a program, a routine, sets of instructions, or a process for performing at least one function.

Figure 4:
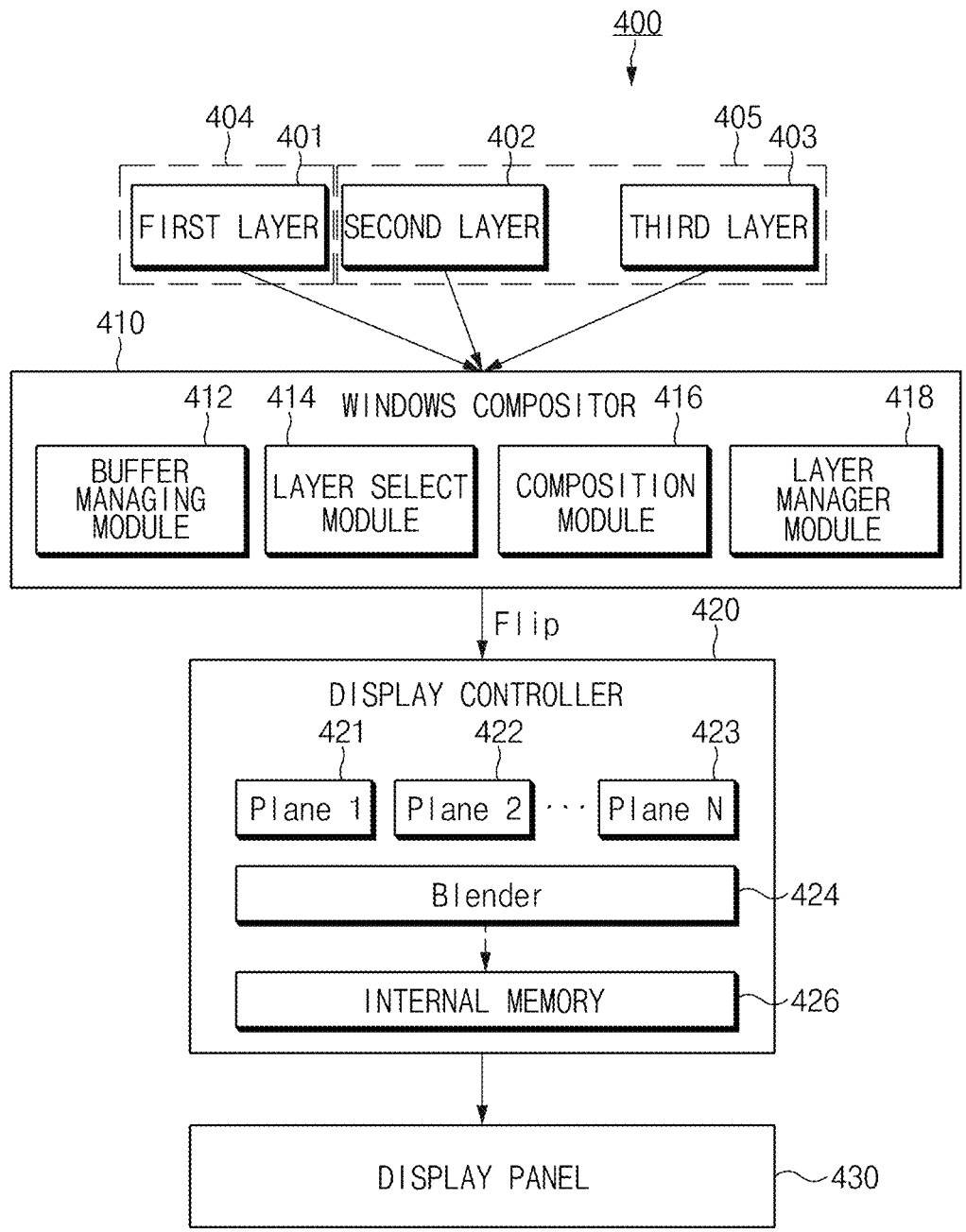
FIG. 4 illustrates an electronic device, according to various embodiments of the present disclosure.

FIG. 4 illustrates an electronic device, according to various embodiments of the present disclosure.

Referring to FIG. 4, an electronic device 400 (e.g., the electronic device 101 of FIG. 1) may include at least one application (e.g., a first application 404 and a second application 405), a plurality of layers (e.g., a first layer 401, a second layer 402, and a third layer 403), a windows compositor 410, a display controller 420, and a display panel 430. According to various embodiments of the present disclosure, the first layer 401 may be included in the first application 404 or may be created to correspond to the first application 404; the second layer 402 and the third layer 403 may be included in the second application 405 or may be created to correspond to the second application 405. According to an embodiment, layers (e.g., the first layer 401 to the third layer 403) may be included on the outside (e.g., the windows compositor 410) of applications (e.g., the first application 404 and the second application 405). Also, the windows compositor 410 may include a buffer managing module 412, a layer select module 414, a composition module 416, and a layer manager module 418. According to various embodiments of the present disclosure, the plurality of applications 404 and 405, the plurality of layers 401, 402, and 403, the windows compositor 410, the display controller 420, and the display panel 430 may be operated by a processor (e.g., the processor 120 of FIG. 1).

According to various embodiments of the present disclosure, the windows compositor 410 may be used as the term meaning the composition module 416 based on a kind of framework (or operating system). For example, the buffer managing module 412 or the layer select module 414 may be disposed on the outside of the windows compositor 410. According to various embodiments, the plurality of modules 410, 412, 414, 416, and 418 may be integratedly or separately implemented with one or more modules. For example, the composition module 416 and the layer manager module 418 may be implemented with one module (e.g., a surface flinger).

In the case where an application (e.g., the first application 404 or the second application 405) is executed by an electronic device, the application may request a partial area of a screen, in which an application image is to be drawn, from the framework (e.g., the windows compositor 410). The framework (e.g., the windows compositor 410) may allocate the partial area of the screen in response to a request of each application and may manage information (e.g., a layer) about the allocated area.

The layer refers to information for managing a screen area (e.g., a layer area or a surface area) corresponding to an application. For example, the layer that is an object or instance corresponding to a specified data structure may be created and deleted by an application request. In an embodiment, the layer may include information about an address of a graphic buffer, in which an application will draw an image (or graphic data), a frame area (a layer-occupied location in the whole area of the frame buffer), and the like. The term "layer" used in this specification is not limited to a specific term, and any other terms (e.g., a surface and a window) may be used instead of the layer. FIG. 4 indicates the first layer 401, which is generated to correspond to a first application, and the second layer 402 and the third layer 403, which are generated to correspond to a second application, as an embodiment. Each layer is illustrated in FIG. 4 as being disposed in applications. However, according to various embodiments, a substance of a layer may be located in a different module such as the windows compositor 410.

The layer manager module 418 (e.g., a processor) may manage at least one layer generated by applications. For example, the layer manager module 418 may create or delete a layer in response to requests of the applications and may manage at least one layer by using a list.

According to an embodiment, in the case where an application is executed, the layer manager module 418 (e.g., the processor) may create at least one layer corresponding to the application. According to an embodiment, in the case where an application changes a screen configuration, the layer manager module 418 may change layer information based on a change in the screen configuration. For example, in the case of a map application, the layer manager module 418 may create a layer to provide map data and a menu layer used in the map application. Also, the layer manager module 418 may create a status bar layer to be displayed in the display panel 430 together with the map application.

According to various embodiments of the present disclosure, the application may include an application to be executed through an application icon and a home screen application (or a launcher application) in which the application icon is included. During execution of the home screen application, the layer manager module 418 may create a launcher layer, a wallpaper layer, and a status bar layer. Also, in the case where a notification is generated during execution of an application, the layer manager module 418 may further create a layer for the notification.

According to an embodiment, the buffer managing module 412 may create and manage a graphic buffer. An application or layer may request (or dequeue) a buffer from the buffer managing module 412. The buffer managing module 412 may create (or allocate) a graphic buffer for an application or layer by which a buffer is requested. The graphic buffer may correspond to a graphic buffer that is allocated to the buffer managing module 412 by a kernel (e.g., the kernel 320 of FIG. 3). The graphic buffer may be allocated for each layer. For example, a graphic buffer that corresponds to the second layer 402 of the second application 405 and a graphic buffer that corresponds to the third layer 403 of the second application 405 may be allocated independently of each other. The buffer managing module 412 may allocate a plurality of graphic buffers to one layer depending on multiple buffering (e.g., a double buffer or a triple buffer). It may be possible to make use of the plurality of buffers allocated to one layer alternately at a vsync cycle, for example, in a flip manner.

According to various embodiments of the present disclosure, if a buffer for a layer is requested, the buffer managing module 412 may determine whether the layer by which the buffer is requested is a target layer. The target layer may correspond to a layer on which composition is performed by a blender 424 included in the display controller 420. A non-target layer may correspond, for example, to a layer on which composition is performed by the composition module 416 included in the windows compositor 410. Whether a layer is a target layer may be determined by the layer select module 414.

According to various embodiments of the present disclosure, the layer select module 414 may determine whether a layer managed by the layer manager module 418 is the target layer (or whether the target is the non-target layer). According to an embodiment, the layer select module 414 may determine the target layer based on at least one of an update frequency of an image, a size of the image (e.g., a size of an area in which the image is to be displayed), a location of the image (e.g., a location of an area in which the image is to be displayed), whether a layer is specified in advance (e.g., whether a layer has a specific name or function), and z-order. For example, the layer select module 414 may determine a layer, of which the update frequency of the image is not less than a specified condition, of which the size of the image is not smaller than a specified size, or of which the z-order is the lowest, as the target layer. According to an embodiment, the layer select module 414 may set a layer, of which the update frequency of the image is high, as the target layer. For example, the layer select module 414 may know the update frequency by inquiring a layer list array, in which information about a running layer (or a running application) is included, from the composition module 416. According to an embodiment, the layer select module 414 may set a layer, of which the image area (size) is wide (large), as the target layer. According to an embodiment, the layer select module 414 may set the target layer with reference to a target layer list stored in a memory. For example, the layer select module 414 may set a layer, which included in the target layer list, as the target layer. According to an embodiment, a layer corresponding to a video play screen, a layer corresponding to a web browsing screen, a layer corresponding to a navigation map screen, a layer corresponding to a camera preview screen, a layer corresponding to a call screen, and the like may be set as target layers.

According to an embodiment, in the z-order between images with a different layer, the layer select module 414 may set the target layer such that a non-target layer exists between target layers or a target layer does not exist between non-target layers. According to various embodiments of the present disclosure, the z-order may include only z-order that is used upon performing composition in the OS but also z-order of a changed order in the case where an order between layers is changeable. For example, even though areas (sizes) occupied by images of two layers are the same, if areas of the layers, which are drawn in the actual images, do not overlap each other, the z-order between the corresponding layers may be changeable.

According to an embodiment, the layer select module 414 may set the target layer with reference to the target layer list stored in the memory. For example, the layer select module 414 may compare layers managed by the layer manager module 418 with the target layer list and may set a layer included in the target layer list as a target layer.

According to an embodiment, the layer select module 414 may determine the number of target layers in consideration of the number of planes of the display controller 420. According to an embodiment, a plane that is a module included in the display controller 420 may fetch a graphic buffer or frame buffer having a specific memory address by using direct memory access (DMA) and may transmit the fetched buffer to a blender or a display interface (e.g., MIPI-DSI (Mobile Industry Processor Interface-Display Serial Interface)). According to an embodiment, the composition module 416 may set an address of a graphic buffer to a plane. For example, one of planes of the display controller 420 may be for a frame buffer on which GPU composition is performed, and the layer select module 414 may determine the number of target layers to correspond to the remaining planes of the display controller 420. One target layer may be allocated to one plane.

The layer select module 414 may repeatedly determine whether a layer is a target layer at a specified interval. That is, whether a specific layer is a target layer may be changed in process of time. For example, if an update frequency of a layer that is determined as being not the target layer is not less than a specified condition, the layer may be determined as the target layer.

According to various embodiments of the present disclosure, the layer select module 414 may classify respective layers into a first composition type and a second composition type, based on whether a layer is a target layer or a non-target layer. For example, the layer select module 414 may classify the non-target layer as the first composition type and may classify the target layer as the second composition type. That is, the first composition type may refer to a type on which composition is performed by the composition module 416 included in the windows compositor 410, and the second composition type may refer to a type on which composition is performed by the blender 424 included in the display controller 420. In the Android OS according to an embodiment of the present disclosure, the first composition type may refer to a GLES (or openGL ES) type, and the first composition type may refer to a hardware composer (HWC).

The applications 404 and 405 may draw an image in buffers allocated to layers 401, 402, and 403. Drawing may mean, for example, an operation in which an image (or graphic data) is sent to (or written in) a buffer. The image may be an image that an application intends to provide through the display panel 430. According to an embodiment, the image may be drawn in the graphic buffer based on coordinates of an area, which a layer occupies, of the whole frame area. For example, if a frame area of a specific layer has coordinates of x start=0, x end=800, y start=25, and y end=1280 with respect to a resolution of 800*1280, an application may draw a final image to be displayed at the corresponding coordinates in a graphic buffer allocated to a layer. The application (or layer) may transmit information (e.g., coordinate information) about the graphic buffer, in which the image is drawn, to the buffer managing module 412. For example, an application may request the buffer managing module 412 to output the drawing-completed graphic buffer (queue). The buffer managing module 412 may manage the corresponding graphic buffer at a composition standby state in response to the graphic buffer output request.

The composition module 416 may integrally manage an address of a graphic buffer, in which image-related information finally generated by an application (or layer) is stored, a frame area (a location, which a layer area occupies, in the whole area of the frame buffer), and the like with respect to each layer. According to various embodiments of the present disclosure, the composition module 416 may manage the layer list array in which information about a running layer (or a running application) is included. For example, when an application (or layer) is executed, the application may transmit information, such as a frame interval, source crop, and pixel format, to the composition module 416. Also, in the case where the information, such as the frame interval, the source crop, and the pixel format, is changed during the execution of the application, the composition module 416 may be notified of the changed information.

According to an embodiment, the composition module 416 may determine whether a graphic buffer of a composition standby state exists. In the case where a frame rate is 60 Hz, the composition module 416 may be triggered by the vsync generated per 16.6 ms and may determine whether a graphic buffer of a composition standby state exists. If a graphic buffer of the composition standby state does not exist, the composition module 416 enters a sleep state until next vsync and may perform composition when a graphic buffer of the composition standby state exists. According to an embodiment, the composition module 416 may perform composition by using a graphic library 440. The graphic library may include, for example, OpenGL ES, DIRECT3D®, Stage3D, and the like. The graphic library 440 may perform composition, for example, by using a GPU 450.

According to an embodiment, the composition module 416 may determine whether each graphic buffer of the composition standby state is a graphic buffer associated with a non-target layer. For example, the composition module 416 may determine that the first layer 401 and the second layer 402 are non-target layers and that the third layer 403 is a target layer. According to an embodiment, the composition module 416 may perform composition only on a graphic buffer of the composition standby state, which is associated with the non-target layer. For example, the composition module 416 may compose images, which are drawn in graphic buffers corresponding to the first layer 401 and the second layer 402 that are the non-target layers, in a frame buffer. The composition module 416 may transmit information of a graphic buffer corresponding to the third layer 403 to the display controller 420 without performing a separate composition operation on an image drawn in the graphic buffer corresponding to the third layer 403 that is the target layer.

According to an embodiment, the composition module 416 may perform composition on all graphic buffers if a graphic buffer of the composition standby state, which is associated with a non-target layer, exists. For example, if a graphic buffer of the first layer 401 or the second layer 402, which is a non-target layer, is at the composition standby state, the composition module 416 may compose all images, which are drawn in the graphic buffers corresponding to the first layer 401 to the third layer 404 in the frame buffer.

According to an embodiment, the composition module 416 may make use of a plurality of frame buffers depending on a multiple buffering (e.g., double buffering or triple buffering) scheme. The composition module 416 may make use of the plurality of frame buffers each other alternately at the vsync period, for example, in the flip manner.

The composition module 416 may compose graphic buffers of layers of the first composition type in one frame buffer and may transmit information of the composed frame buffer (information such as a memory start address, a width, a height, and a stride) to the display controller 420. For example, the composition module 416 may transmit the information about the composition-completed frame buffer to the display controller 420 through the kernel.

In the case where a graphic buffer of the composition standby state not composed by the composition module 416 exists, the display controller 420 may compose the graphic buffer of the composition standby state with an image of a frame buffer composed by the composition module 416. For example, a first plane 421 may fetch frame buffers, in which images of the first layer 401 and the second layer 402 are composed, to the blender 424 by using the DMA. As in the above description, also, a second plane 422 may fetch a graphic buffer corresponding to the third layer 403 to the blender 424 by using the DMA. The display controller 420 may not perform separate composition in the case where all graphic buffers of the composition standby state are composed by the composition module 416.

The blender 424 may compose the frame buffer and graphic buffers (or images of the frame buffer and graphic buffers) fetched by the first plane 421 and the second plane 422 and may store at least a portion of a final image being the composition result in an internal memory 426. For example, the blender 424 may repeatedly perform composition by the determined amount (e.g., 2 pixel lines) upon composing buffers and may store the composition result in the internal memory 426. For example, the size of the internal memory 426 may correspond to the size of image data of several pixel lines.

The blender 424 may perform the above-described composition per vsync. For example, the blender 424 may compose the frame buffer of the first plane 421 and the graphic buffer of the second plane 422 at first vsync and may compose the frame buffer of the first plane 421 and the graphic buffer of the second plane 422 at second vsync.

However, according to various embodiments of the present disclosure, in the case where only an image of the third layer 403 is updated at the second vsync without updating images of the first layer 401 and the second layer 402, since a graphic buffer associated with a non-target layer of the composition standby state does not exist, the composition module 416 may not perform composition on the images of the first layer 401 and the second layer 402. Also, in this case, the blender 424 may reuse a frame buffer (a composed image of the first layer 401 and the second layer 402) at the first vsync to perform composition with the graphic buffer of the third layer 403, of which the image is updated.

The display controller 420 may start transmitting an image in the internal memory 426 to the display panel 430 physically connected thereto. As such, the final image being the composition result may be sent to the display panel 430 through the internal memory 426.

An interface that physically connects the display controller 420 and the display panel 430 may include, for example, MIPI-DSI, HDMI, embedded display port (eDP), and the like. The display controller 420 may package an image of a frame buffer to correspond to a protocol of each interface and may transmit the packaged image to the display panel 430.

In various embodiments, the display panel 430 may be an external display device connected with an electronic device through a wired or wireless interface. Since GPU composition increases current consumption and reduces graphic performance overall, if a non-target layer, in which image update does not occur frequently, is composed with a frame buffer after being drawn in a graphic buffer per vsync may cause excessive current consumption and a decrease in graphic performance. Accordingly, to solve the issue, various embodiments of the present disclosure may minimize GPU composition by reusing a frame buffer in which the non-target layers are drawn.

Figure 5:
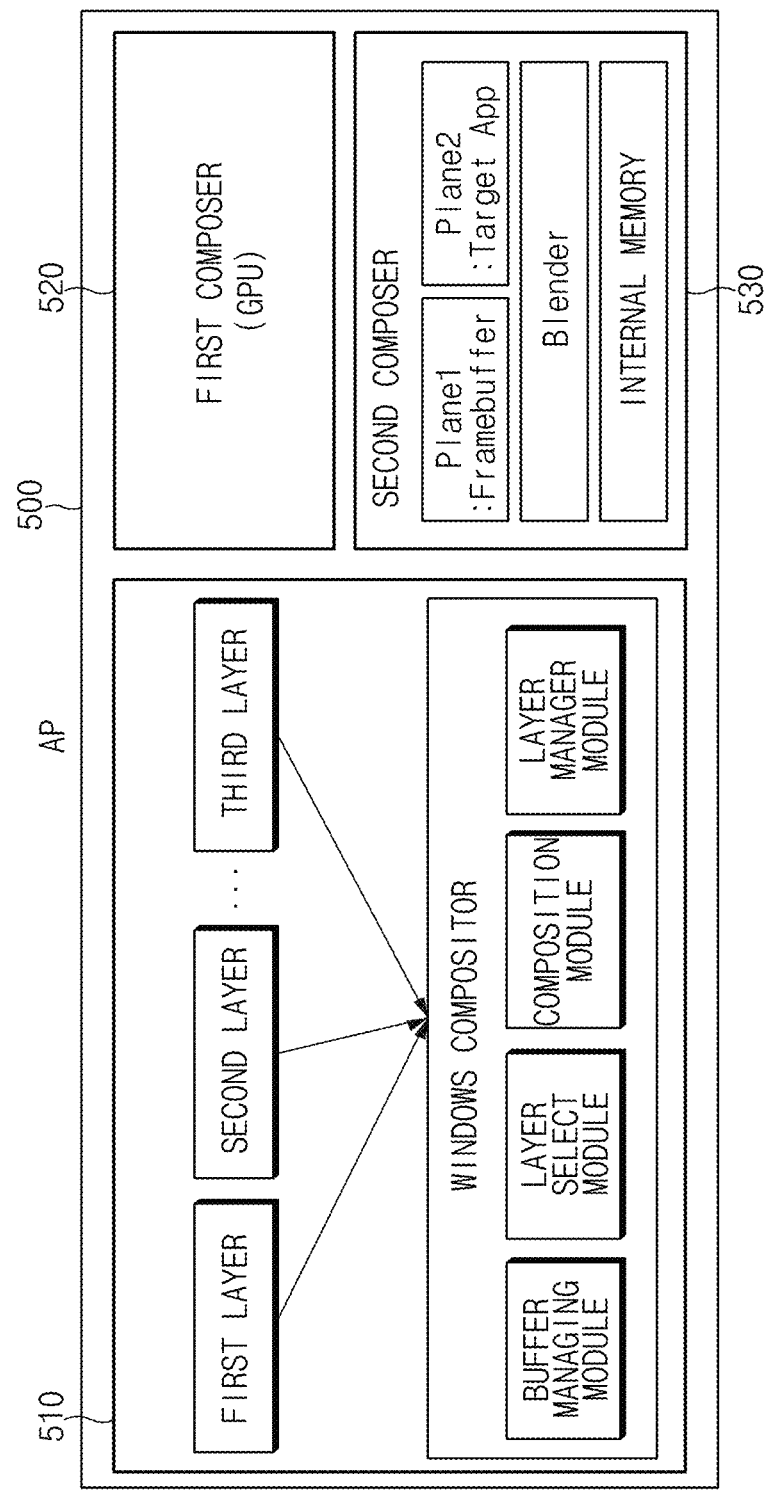
FIG. 5 illustrates an electronic device, according to various embodiments of the present disclosure.

FIG. 5 illustrates an electronic device, according to various embodiments of the present disclosure.

Referring to FIG. 5, an application processor (AP) 500 (e.g., the processor 120 of FIG. 1) may include a program module 510, a first composer 520, and a second composer 530. The AP 500 may be implemented with a system on chip (SoC) such that the first composer 520 and the second composer 530 are embedded in the AP 500.

According to various embodiments of the present disclosure, the first composer 520 may be a graphic processing unit (GPU), a general-purpose processor, or a digital signal processor (DSP). The second composer 530 may be implemented in a display controller. Unlike this, the second composer 530 may be implemented in an input/output (I/O) controller. According to various embodiments of the present disclosure, the second composer 530 may be implemented on the AP 500 as an independent IP.

An electronic device according to various embodiments of the present disclosure may include a first graphic composer that composes first graphic data associated with a layer of a first composition type, a second graphic composer that that composes second graphic data associated with a layer of a second composition type different from the first composition type, and a processor. The processor may be configured to set a composition type of each of a plurality of layers associated with at least one application to the first composition type or the second composition type, compose first graphic data corresponding to a layer, which is set to the first composition type, from among the plurality of layers in a frame buffer by using the first graphic composer, compose the composed graphic data in the frame buffer and second graphic data corresponding to a layer, which is set to the second composition type, from among the plurality of layers by using the second graphic composer, and display the graphic data composed by using the second graphic composer through a display operatively connected with the electronic device.

According to an embodiment, the first graphic composer may be a software composer, and the second graphic composer may be a hardware composer.

According to an embodiment, the processor may be configured to, if an update is not generated with respect to the first graphic data and an update is generated with respect to the second graphic data, prohibit the composition using the first graphic composer and compose the composed graphic data in the frame buffer and third graphic data corresponding to the updated second graphic data by using the second graphic composer.

According to an embodiment, the processor may be configured to set a composition type of each of the plurality of layers based on at least one of update frequency information of graphic data corresponding to each of the plurality of layers, z-order information, size information corresponding to each of the plurality of layers, and location information of an area in which graphic data corresponding to each of the plurality of layers are to be displayed.

According to an embodiment, the processor may be configured to set a composition type of a layer, in which an update frequency of the graphic data is not less than a specified value, from among the plurality of layers to the second composition type, and set a composition type of a layer, in which the update frequency of the graphic data is less than the specified value, from among the plurality of layers to the first composition type.

According to an embodiment, the processor may be configured to set a composition type of a layer, in which a size of the graphic data is not less than a specified value, from among the plurality of layers to the second composition type, and set a composition type of a layer, in which the size of the graphic data is less than the specified value, from among the plurality of layers to the first composition type.

According to an embodiment, the processor may be configured to determine whether each of the plurality of layers is included in a list stored in a memory in advance, set a composition type of a layer, which is included in the list, from among the plurality of layers to the second composition type, and set a composition type of a layer, which is not included in the list, from among the plurality of layers to the first composition type.

According to an embodiment, the processor may be configured to verify a z-order of each of the plurality of layers, and set a composition type of each of the plurality of layers such that a layer of the second composition type exists between layers of the first composition type or a layer of the first composition type does not exist between layers of the second composition type.

According to an embodiment, the number of layers of the first composition type and the number of layers of the second composition types may be determined based on the number of planes included in the second graphic composer.

According to an embodiment, the plurality of layers may correspond to different applications executed by the processor, respectively.

Figure 6:
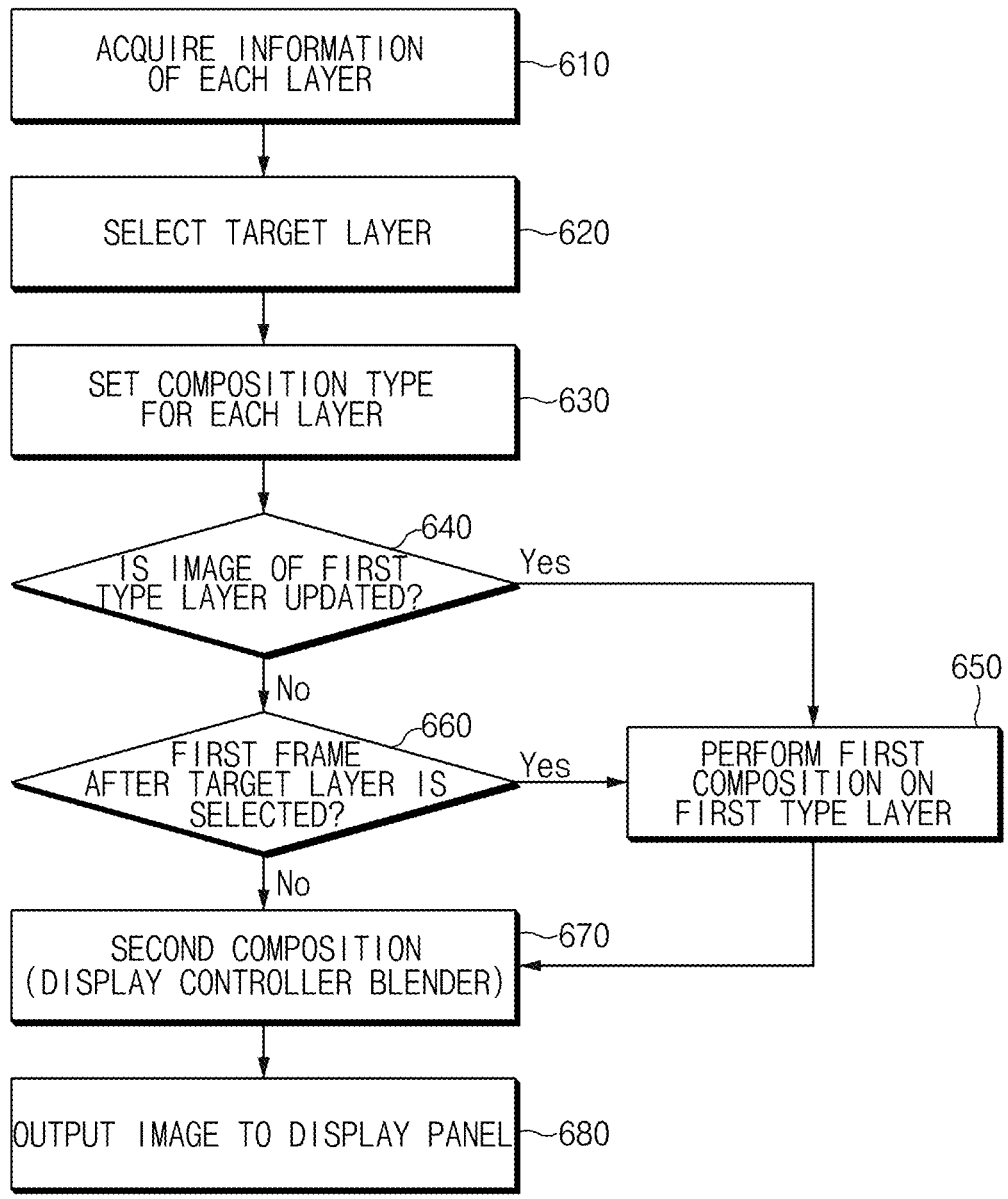
FIG. 6 illustrates a method in which an electronic device performs image composition and displays the composed image, according to various embodiments of the present disclosure.

FIG. 6 illustrates a method in which an electronic device performs image composition and displays the composed image, according to various embodiments of the present disclosure.

In operation 610, the electronic device 400 (e.g., the layer manager module 418) may acquire information about each layer generated according to an execution of an application. For example, the layer manager module 418 may acquire at least one of an update frequency of an image of each layer, a size of the image (e.g., a size of an area in which the image is to be displayed), a location of the image (e.g., a location of an area in which the image is to be displayed), a layer name, and z-order. According to various embodiments of the present disclosure, operation 610 may be repeatedly performed periodically or randomly. For example, operation 610 may be performed when a configuration of a layer managed by the layer manager module 418 is changed (e.g., layer creation and deletion). Alternatively, operation 610 may be performed periodically even though a configuration of a layer managed by the layer manager module 418 is not changed.

In operation 620, the electronic device 400 (e.g., the layer select module 414) may select at least one or more target layers of the layers by using information about each layer acquired in operation 610. The number of the target layers may be determined based on the number of planes 421 and 422 in the display controller 420. According to an embodiment, the number of target layers may be determined to be less than the number of planes 421 and 422 in the display controller 420. For example, if the number of candidates selectable as a target layer is larger than the number of planes 421 and 422, the number of target layers may be adjusted by setting some of layers corresponding to the candidates to non-target layers.

In operation 630, the electronic device 400 (e.g., the layer select module 414) may set a composition type for each of the target and non-target layers classified in operation 620. For example, the non-target layer may be set to have the first composition type, and the target layer may be set to have the second composition type.

In operation 640, the electronic device 400 (e.g., the composition module 416) may determine whether an update is generated with respect to an image of a layer (non-target layer) of the first composition type. If an update is generated with respect to the image of the layer of the first composition type, the process may proceed to operation 650. If an update is not generated with respect to the image of the layer of the first composition type, the process may proceed to operation 660.

In operation 650, the electronic device 400 (e.g., the composition module 416) may perform first composition. For example, in operation 650, the electronic device 400 may perform software composition (e.g., composition corresponding to the first composition type) on a layer (e.g., a non-target layer) of the first composition type, on which an image update is generated. The software composition may refer to composition executed by the GPU or CPU.

In operation 660, the electronic device 400 (e.g., the composition module 416) may determine whether a layer of the first composition type is the first frame to be composed in a frame buffer after the target layer is selected in operation 620.

If the layer of the first composition type is the first frame to be composed in the frame buffer after the target layer is selected, the process may proceed to operation 650 after operation 660 is performed. For example, the case where the layer of the first composition type is the first frame to be composed in the frame buffer after the target layer is selected may mean that a frame buffer to be reused (or a composed image to be reused) does not exist, and thus, the process may proceed to operation 650. The case where the current frame is not the first frame after the target layer is selected in operation 620 may mean that a frame buffer to be reused exists, and thus, the process may proceed to operation 670.

According to various embodiments of the present disclosure, operation 640 and operation 660 may be interchangeable in order.

In operation 670, the electronic device 400 (e.g., the display controller 420) may perform second composition. For example, the electronic device 400 may perform composition of a graphic buffer (e.g., a graphic buffer corresponding to the target layer) and a frame buffer in which image composition is performed in operation 650. The composition of operation 670 that corresponds to composition (e.g., composition corresponding to the second composition type) of the blender 424 as a hardware component included in the display controller 420 may be different from the composition of operation 650.

In operation 680, the electronic device 400 (e.g., the display controller 420) may output a final image composed in operation 670 to the display panel 430.

Figure 7:
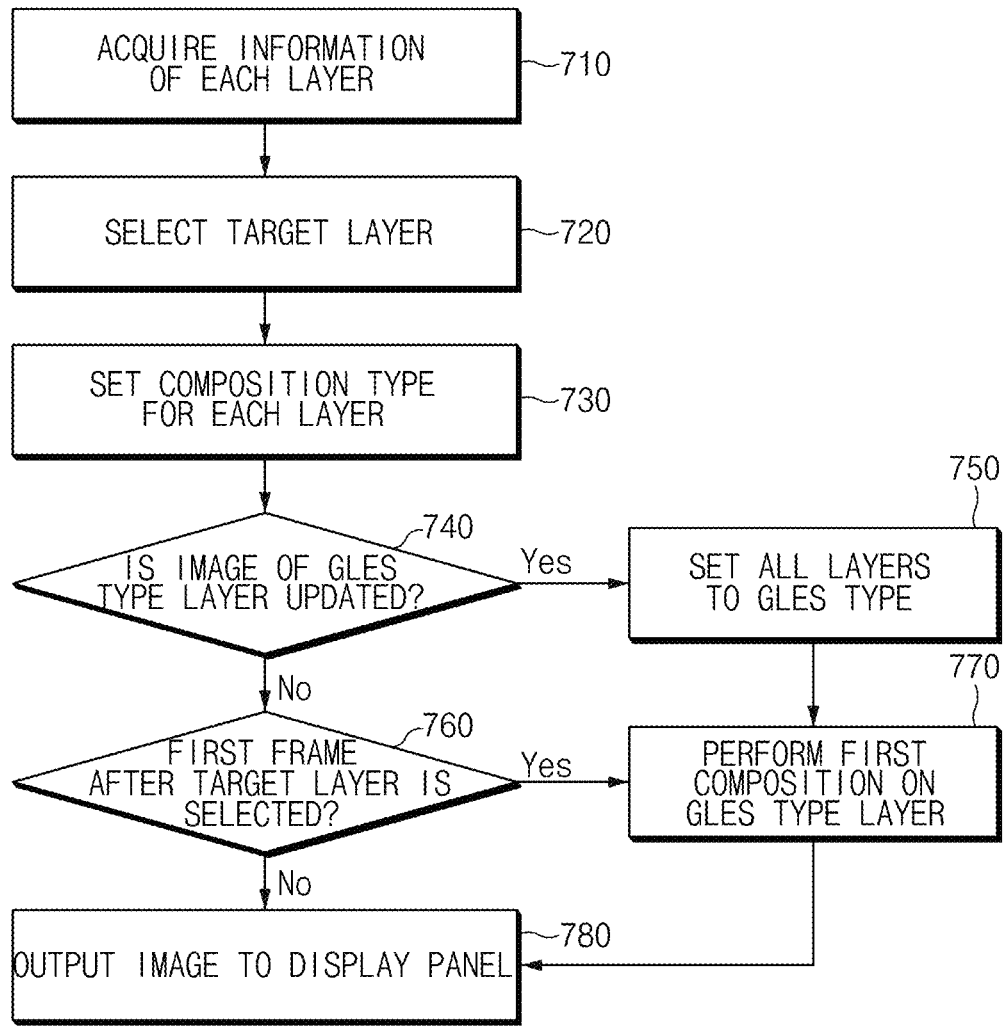
FIG. 7 illustrates a method in which an electronic device performs image composition and displays the composed image, according to various embodiments of the present disclosure.

FIG. 7 illustrates a method in which an electronic device performs image composition and displays the composed image, according to various embodiments of the present disclosure.

In operation 710, the electronic device 400 (e.g., the layer manager module 418) may acquire information about each layer generated according to an execution of an application. For example, the layer manager module 418 may acquire at least one of an update frequency of an image of each layer, a size of the image (e.g., a size of an area in which the image is to be displayed), a location of the image (e.g., a location of an area in which the image is to be displayed), a layer name, and z-order. According to various embodiments of the present disclosure, operation 710 may be repeatedly performed periodically or randomly. For example, operation 710 may be performed when a configuration of a layer managed by the layer manager module 418 is changed (e.g., layer creation and deletion). Alternatively, operation 720 may be performed periodically even though a configuration of a layer managed by the layer manager module 418 is not changed. In operation 720, the electronic device 400 (e.g., the layer select module 414) may select at least one or more target layers of the layers by using information about each layer acquired in operation 710. The number of the target layers may be determined based on the number of planes 421 and 422 in the display controller 420.

In operation 730, the electronic device 400 (e.g., the layer select module 414) may set a composition type for each of the target and non-target layers classified in operation 720. For example, the non-target layer may be set to have the first composition type, and the target layer may be set to have the second composition type. According to an embodiment, the number of target layers may be determined to be less than the number of planes 421 and 422 in the display controller 420. For example, if the number of candidates selectable as a target layer is larger than the number of planes 421 and 422, the number of target layers may be adjusted by setting some of layers corresponding to the candidates to non-target layers.

In operation 740, the electronic device 400 (e.g., the composition module 416) may determine whether an update is generated with respect to an image of a layer (non-target layer) of the first composition type. If an update is generated with respect to the image of the layer of the first composition type, the process may proceed to operation 750. If an update is not generated with respect to the image of the layer of the first composition type, the process may proceed to operation 760.

In operation 750, the electronic device 400 (e.g., the composition module 416) may again set composition types of all layers set in operation 730 to the first composition type. After operation 750 is performed, the process may proceed to operation 770.

In operation 770, the electronic device 400 (e.g., the composition module 416) may perform GPU composition on layers (all layers) of the first composition type. The GPU composition may refer to software composition.

In operation 760, the electronic device 400 (e.g., the composition module 416) may detei mine whether a layer of the first composition type is the first frame to be composed in a frame buffer after the target layer is selected in operation 720. If the layer of the first composition type is the first frame to be composed in the frame buffer after the target layer is selected, the process may proceed to operation 770. For example, the case where the layer of the first composition type is the first frame to be composed in the frame buffer after the target layer is selected may mean that a frame buffer to be reused (or a composed image to be reused) does not exist, and thus, the process may proceed to operation 770. If the current frame is not the first frame after the target layer is selected, the process may proceed to operation 780.

In operation 780, the electronic device 400 (e.g., the composition module 416) may output a final image composed in operation 770 to the display panel 430. For example, the composed final image may be output to the display panel 430 through the display controller 420.

According to the embodiment described with reference to FIGS. 6 and 7, in the case where a layer of a low update frequency is set to a non-target layer and a layer of a high update frequency is set to a target layer, the case where only composition of a second type (e.g., a HWC type) is performed on the target layer is many, and thus, a composition frequency of a first type (e.g., a GLES type) accompanying GPU composition may decrease.

Figure 8:
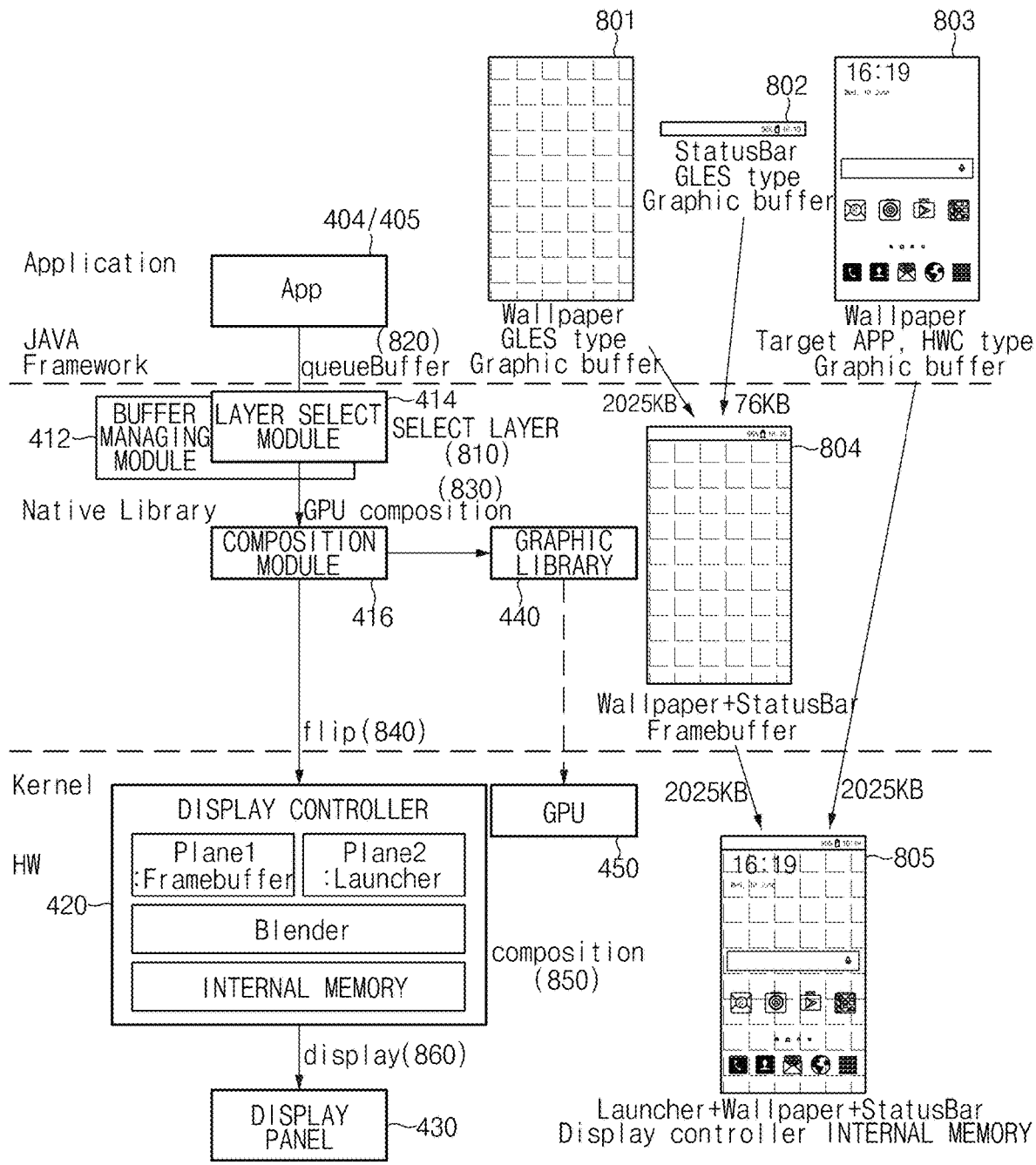
FIG. 8 illustrates a method in which an electronic device performs image composition and displays the composed image at first vsync, according to various embodiments of the present disclosure.

FIG. 8 illustrates a method in which an electronic device performs image composition and displays the composed image at first vsync, according to various embodiments of the present disclosure.

In operation 810, the layer select module 414 may select a target layer/non-target layer of a plurality of layers (e.g., the first layer 401, the second layer 402, and the third layer 403) corresponding to executed applications 404 and 405. For example, the layer select module 414 may select the first layer 401 and the second layer 402 as the non-target layer and may select the third layer 403 as the target layer.

In operation 820, the buffer managing module 412 may allocate a graphic buffer to each of the first layer 401, the second layer 402, and the third layer 403 in response to requests of the applications (e.g., dequeueBuffer). The first layer 401, the second layer 402, and the third layer 403 may draw a first image 801, a second image 802, and a third image 803 in the allocated graphic buffers, respectively. In this case, information about each graphic buffer in which an image is drawn may be sent to the composition module 416 (e.g., enqueueBuffer).

In operation 830, the composition module 416 may compose the first image 801 and the second image 802 corresponding to the first layer 401 and the second layer 402, which are selected as the non-target layer, in a frame buffer. The composition module 416 may perform composition by using the graphic library 440. In this case, the graphic library 440 may use the GPU 450. The composition of operation 830 may be, for example, GPU composition.

In operation 840, the composition module 416 may transmit a composed image 804 composed in the frame buffer in operation 830 and the third image 803 to the display controller 420. For example, the composition module 416 may transmit information (e.g., a memory start address, a width, a height, and a stride) about the frame buffer, in which images are composed, and information about a graphic buffer, in which the third image 803 is drawn, to the display controller 420.

In operation 850, the display controller 420 may generate a final image 805 by composing the composed image 804 and the third image 803.

In operation 860, the display controller 420 may transmit the final image 805 to the display panel 430 so as to be provided to a user.

Figure 9:
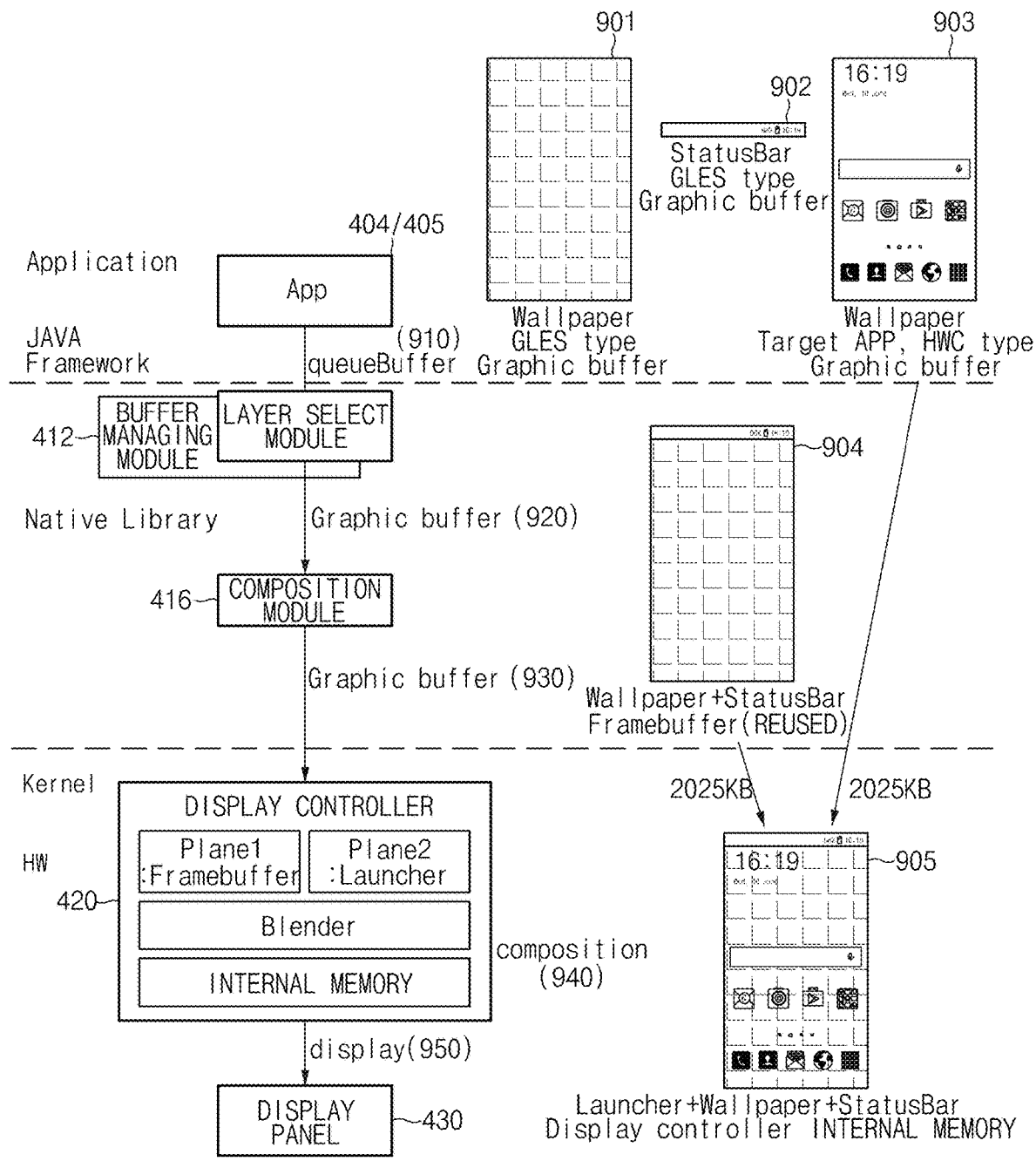
FIG. 9 illustrates a method in which an electronic device performs image composition and displays the composed image at second vsync, according to various embodiments of the present disclosure.

FIG. 9 illustrates a method in which an electronic device performs image composition and displays the composed image at second vsync, according to various embodiments of the present disclosure. An embodiment is exemplified in FIG. 9 as, between first vsync and second vsync, a first image 901 and a second image 902 are not updated and a third image 903 is updated.

In operation 910, the buffer managing module 412 may allocate a graphic buffer to a third layer 403 on which an image update is generated. The third layer 403 may draw the third image 903 in the allocated graphic buffer.

In operation 920, the graphic buffer in which the third image 903 is drawn may be sent to the composition module 416.

In operation 930, the graphic buffer in which the third image 903 is drawn may be transmitted to the display controller 420. Since an image update is not generated with respect to a layer (e.g., a non-target layer) of the first composition type, the composition module 416 may not perform composition.

In operation 930, the display controller 420 may generate a final image 905 by performing composition with the third image 903 by reusing a composed image 904 composed at first vsync.

In operation 960, the display controller 420 may transmit the final image 905 to the display panel 430 so as to be provided to a user.

Figure 10:
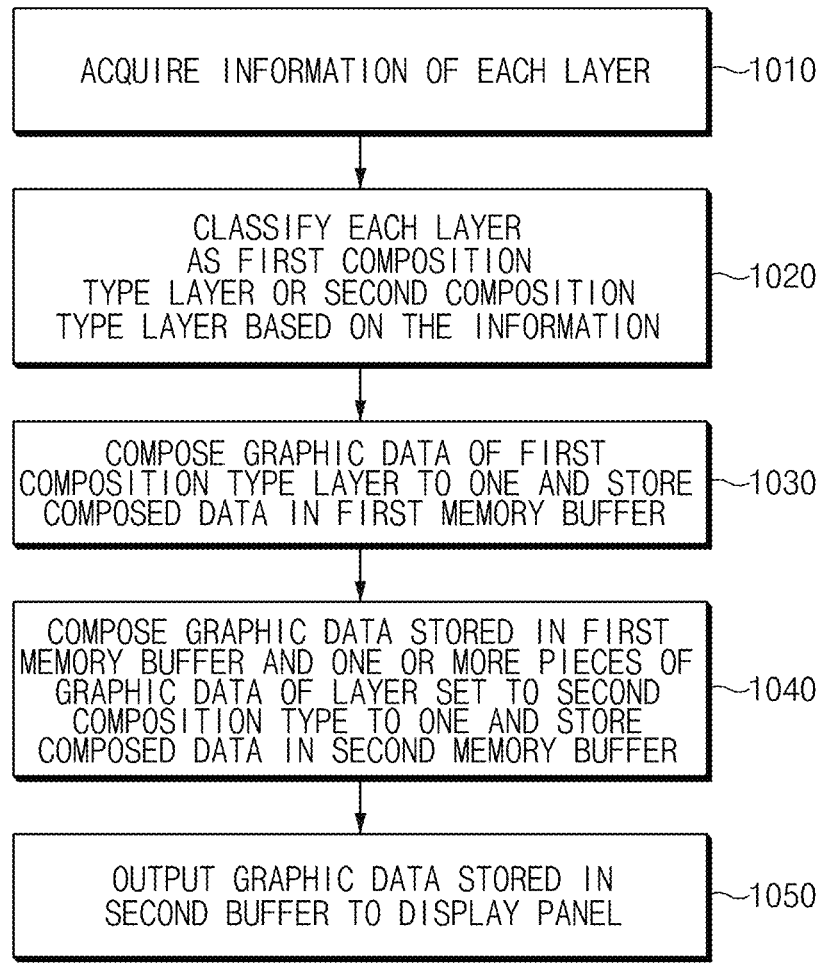
FIG. 10 illustrates a method in which an electronic device performs image composition and displays the composed image, according to various embodiments of the present disclosure.

FIG. 10 illustrates a method in which an electronic device performs image composition and displays the composed image, according to various embodiments of the present disclosure.

In operation 1010, an electronic device may acquire information about each of layers.

In operation 1020, the electronic device may classify each layer as a layer of the first composition type or a layer of the second composition type based on the information acquired in operation 1010.

In operation 1030, the electronic device may compose graphic data of a plurality of layers classified as a layer of the first composition type in operation 1020 to one and may store the composed graphic data in a first memory buffer (e.g., a frame buffer).

In operation 1040, the electronic device may compose the graphic data stored in the first memory buffer and pieces of graphic data of at least one or more layers classified as a layer of the second composition type in operation 1020 to one and may store the composed graphic data in a second memory buffer (e.g., the internal memory 426).

In operation 1050, the electronic device may output graphic data stored in the second memory buffer to a display panel.

A graphic data composing method of an electronic device according to various embodiments of the present disclosure may include setting a composition type of each of a plurality of layers associated with at least one application to a first composition type or a second composition type, composing first graphic data corresponding to a layer, which is set to the first composition type, from among the plurality of layers in a frame buffer by using a first graphic composer, composing the composed graphic data in the frame buffer and second graphic data corresponding to a layer, which is set to the second composition type, from among the plurality of layers by using a second graphic composer, and displaying the graphic data composed by using the second graphic composer through a display operatively connected with the electronic device.

According to an embodiment, the first graphic composer may be a software composer, and the second graphic composer may be a hardware composer.

According to an embodiment, the method may further include prohibiting the composition using the first graphic composer if an update is not generated with respect to the first graphic data and an update is generated with respect to the second graphic data, and composing the composed graphic data in the frame buffer and third graphic data corresponding to the updated second graphic data by using the second graphic composer.

According to an embodiment, the setting of the composition type of each of the plurality of layers may include setting a composition type of each of the plurality of layers based on at least one of update frequency information of graphic data corresponding to each of the plurality of layers, z-order information, size information corresponding to each of the plurality of layers, and location information of an area in which graphic data corresponding to each of the plurality of layers is to be displayed.

According to an embodiment, the setting of the composition type of each of the plurality of layers may include setting a composition type of a layer, in which an update frequency of the graphic data is not less than a specified value, from among the plurality of layers to the second composition type, and setting a composition type of a layer, in which the update frequency of the graphic data is less than the specified value, from among the plurality of layers to the first composition type.

According to an embodiment, the setting of the composition type of each of the plurality of layers may include setting a composition type of a layer, in which a size of the graphic data is not less than a specified value, from among the plurality of layers to the second composition type, and setting a composition type of a layer, in which the size of the graphic data is less than the specified value, from among the plurality of layers to the first composition type.

According to an embodiment, the setting of the composition type of each of the plurality of layers may include determining whether each of the plurality of layers is included in a list stored in a memory in advance, setting a composition type of a layer, which is included in the list, from among the plurality of layers to the second composition type, and setting a composition type of a layer, which is not included in the list, from among the plurality of layers to the first composition type.

According to an embodiment, the setting of the composition type of each of the plurality of layers may include verifying a z-order of each of the plurality of layers, and setting a composition type of each of the plurality of layers such that a layer of the second composition type exists between layers of the first composition type or a layer of the first composition type does not exist between layers of the second composition type.

According to an embodiment, the number of layers of the first composition type and the number of layers of the second composition types may be determined based on the number of planes included in the second composer.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media in the form of a program module. The instruction, when executed by a processor, may cause the one or more processors to perform a function corresponding to the instruction. The computer-readable storage media, for example, may be a memory.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments of the present disclosure, and vice versa.

According to various embodiments of the present disclosure, a computer-readable recording medium having recorded thereon a program, the program, when executed, performing a method including setting a composition type of each of a plurality of layers associated with at least one application to a first composition type or a second composition type, composing first graphic data corresponding to a layer, which is set to the first composition type, from among the plurality of layers in a frame buffer by using a first graphic composer, composing the composed graphic data in the frame buffer and second graphic data corresponding to a layer, which is set to the second composition type, from among the plurality of layers by using a second graphic composer, and displaying the graphic data composed by using the second graphic composer through a display operatively connected with the electronic device.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

An electronic device and a method according to various embodiments of the present disclosure may reduce current consumption associated with a graphic-related process of an application by reducing the number of memory copy operations for graphic composition of the application.

Although the present disclosure has been described with an example embodiment, various changes and modifications may be suggested to one skilled in the art. It is intended that the present disclosure encompass such changes and modifications as fall within the scope of the appended claims.

What is claimed is:

1. An electronic device comprising:
   a first graphic composer configured to compose first graphic data;
   a second graphic composer configured to compose second graphic data; and
   a processor configured to:
      obtain update frequency information regarding a plurality of layers that are associated with at least one application while the at least one application is executed;
      determine a number of layers of the plurality of layers to select as target layers based on a number of planes and the update frequency information;
      set the target layers to a second composition type when the update frequency information is equal to or greater than a specified value and set one layer of the plurality of layers to a first composition type when the update frequency information is less than the specified value, the first composition type is different than the second composition type;
      when at least one layer of the plurality of layers is set to the first composition type, compose the first graphic data in a frame buffer by using the first graphic composer;
      compose the first graphic data and the second graphic data, the second graphic data corresponds to another layer of the plurality of layers that is set to the second composition type by using the second graphic composer; and
      display the first graphic data and the second graphic data composed by using the second graphic composer through a display operatively connected with the electronic device.

2. The electronic device of claim 1, wherein the first graphic composer is a software composer and the second graphic composer is a hardware composer.

3. The electronic device of claim 1, wherein the processor is configured to:
   determine whether a first update is generated for the first graphic data and whether a second update is generated for the second graphic data;

in response to determining that the first update is not generated for the first graphic data and the second update is generated for the second graphic data, prohibit the first graphic composer from composing;

in response to determining that the second update is generated for the second graphic data, updating the second graphic data; and compose the first graphic data and a third graphic data, by using the second graphic composer, wherein the third graphic data corresponds to the updated second graphic data.

4. The electronic device of claim 1, wherein the processor is configured to set each of the plurality of layers to the first composition type or the second composition type based on at least one of:

z-order information, size information corresponding to each of the plurality of layers, and location information of an area that graphic data corresponding to each of the plurality of layers are to be displayed.

5. The electronic device of claim 4, wherein the processor is configured to:

set a composition type of one layer of the plurality of layers, to the second composition type when a size of the graphic data is equal to or greater than a specified value, and set the composition type of the one layer of the plurality of layers, to the first composition type when the size of the graphic data is less than the specified value.

6. The electronic device of claim 4, wherein the processor is configured to:

determine whether each of the plurality of layers is included in a list stored in a memory, set a composition type of one layer of the plurality of layers, to the second composition type when the one layer is included in the list, and set the composition type of the one layer, of the plurality of layers, to the first composition type when the one layer is not included in the list.

7. The electronic device of claim 4, wherein the processor is configured to:

verify a z-order of each of the plurality of layers, and set each of the plurality of layers to the first composition type or the second composition type such that the second composition type is between layers of the first composition type or the first composition type does not exist between one or more layers of the second composition type.

8. The electronic device of claim 1, wherein a number of layers of the first composition type and a number of layers of the second composition type are determined based on the number of planes that are included in the second graphic composer.

9. The electronic device of claim 1, wherein the plurality of layers correspond to different applications executed by the processor, respectively.

10. A graphic data composing method of an electronic device, the method comprising:

obtaining update frequency information regarding a plurality of layers that are associated with at least one application while the at least one application is executed;

determining a number of layers of the plurality of layers to select as target layers based on a number of planes and the update frequency information;

setting the target layers to a second composition type when the update frequency information is equal to or greater than a specified value and set one layer of the plurality of layers to a first composition type when the update frequency information is less than the specified value, the first composition type is different than the second composition type;

when at least one layer of the plurality of layers is set to the first composition type, composing a first graphic data in a frame buffer by using a first graphic composer;

composing the first graphic data and a second graphic data, the second graphic data corresponds to another layer of the plurality of layers that is set to the second composition type by using a second graphic composer; and displaying the first graphic data and the second graphic data composed by using the second graphic composer through a display operatively connected with the electronic device.

11. The method of claim 10, wherein the first graphic composer is a software composer, and the second graphic composer is a hardware composer.

12. The method of claim 10, further comprising:

determining whether a first update is generated for the first graphic data and whether a second update is generated for the second graphic data;

in response to determining that the first update is not generated for the first graphic data and the second update is generated for the second graphic data, prohibiting the first graphic composer from composing;

in response to determining that the second update is generated for the second graphic data, updating the second graphic data; and composing the first graphic data and a third graphic data, by using the second graphic composer, wherein the third graphic data corresponds to the updated second graphic data.

13. The method of claim 10, wherein setting a composition type of each of the plurality of layers comprises setting each of the plurality of layers to the first composition type or the second composition type based on at least one of:

z-order information, size information corresponding to each of the plurality of layers, and location information of an area that graphic data corresponding to each of the plurality of layers is to be displayed.

14. The method of claim 13, wherein setting the composition type of each of the plurality of layers comprises:

setting a composition type of one layer of the plurality of layers, to the second composition type when a size of the graphic data is equal to or greater than a specified value; and setting the composition type of the one layer of the plurality of layers, to the first composition type when the size of the graphic data is less than the specified value.

15. The method of claim 13, wherein setting the composition type of each of the plurality of layers comprises:

determining whether each of the plurality of layers is included in a list stored in a memory;

setting a composition type of one layer of the plurality of layers, to the second composition type when the one layer is included in the list; and setting the composition type of the one layer of the plurality of layers, to the first composition type when the one layer is not included in the list.

16. The method of claim 13, wherein setting the composition type of each of the plurality of layers comprises:
verifying a z-order of each of the plurality of layers; and
setting the composition type of each of the plurality of layers such that the second composition type is between layers of the first composition type or the first composition type does not exist between one or more layers of the second composition type.

17. The method of claim 10, wherein a number of layers of the first composition type and a number of layers of the second composition type are determined based on the number of planes that are included in the second graphic composer.

18. A non-transitory computer-readable recording medium embodying a computer program, the computer program comprising computer readable program code that, when executed by a processor of an electronic device, causes the processor to:
obtaining update frequency information regarding a plurality of layers that are associated with at least one application while the at least one application is executed;
determine a number of layers of the plurality of layers to select as target layers based on a number of planes and the update frequency information;
set the target layers to a second composition type when the update frequency information is equal to or greater than a specified value and set one layer of the plurality of layers to a first composition type when the update frequency information is less than the specified value, the first composition type is different than the second composition type;
when at least one layer of the plurality of layers is set to the first composition type, compose a first graphic data in a frame buffer by using a first graphic composer;
compose the first graphic data and a second graphic data, the second graphic data corresponds to another layer of the plurality of layers that is set to the second composition type by using a second graphic composer; and
display the first graphic data and the second graphic data composed by using the second graphic composer through a display operatively connected with the electronic device.

* * * * *